June 1, 1965 N. LEE 3,186,740
COUPLINGS FOR CONNECTING TUBULAR CONDUITS
Filed Aug. 13, 1962
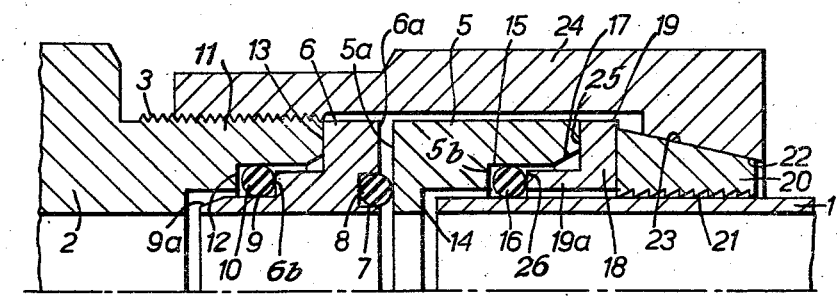
INVENTOR
NORMAN LEE
BY Watson, Cole, Grindle + Watson,
ATTORNEY United States Patent Office 3,186,740
Patented June 1, 1965

3,186,740
COUPLINGS FOR CONNECTING TUBULAR
CONDUITS
Norman Lee, Allesley, Coventry, England, assignor to Keelavite Hydraulics Limited, Allesley, Coventry, England, a company of Great Britain
Filed Aug. 13, 1962, Ser. No. 216,487
Claims priority, application Great Britain, Aug. 16, 1961, 29,617/61
4 Claims. (Cl. 285—101)

This invention relates to couplings for connecting tubular conduits and has for its object to provide a fluid tight coupling assembly for connecting two coaxial tubular conduit members which will not depend for fluid-tightness upon the prevention of relative axial movement between the two tubular conduit members such as tends inevitably to occur to a small degree in practice, and which will, moreover, be usable in cases where it is inconvenient or impossible to shift the two tubular conduit members axially towards one another after they have been brought into axial alignment and/or in which it is necessary or desirable to bring the two tubular conduit members into alignment for connection and or to separate them for disconnection wholly or mainly by relative lateral movement of such tubular conduit members.

A fluid tight coupling assembly according to the present invention for connecting two coaxial tubular conduit members includes two axially displaced coaxial sleeves, the adjacent ends of which are formed with adjacent transverse faces lying face to face and close to one another, one of such adjacent transverse faces being formed to provide an annular groove in which can lie a first sealing ring of the O-ring type in sealing engagement with the other of such adjacent transverse faces while the other ends of the two coaxial sleeves are formed each to co-operate with one of the tubular conduit members in such manner as to provide therewith a circumferential recess to receive a further sealing member of the O-ring type in a position such as to provide a fluid tight seal permitting limited relative axial movement between the sleeve and its associated tubular conduit member, the effective or mean radius of the annular area of the said adjacent transverse faces of the two sleeves on which pressure from within the sleeves acts, being smaller than the effective and mean radius of the annular area of the oppositely directed transverse faces on said sleeves on which pressure from within the sleeves also acts. Thus the resultant of the axial forces on the two sleeves produced by the fluid pressure within the tubular conduit members is in a direction urging the sleeves towards one another and thus maintaining the seal provided by the first O-ring.

The references to transverse faces herein are to be understood as referring to faces which in cross-sections taken along the axis of the assembly are radial or have a substantial effective radial component with respect to the axis of the assembly so that pressures acting thereon apply axial forces to the parts which bear such faces.

Preferably rigid shoulder means are provided on or associated with each of the two coaxial tubular conduit members to ensure that the O-ring seals associated with those conduit members are pushed correctly into their co-operating recesses during the assembly of the two sleeves on their associated conduit members.

One construction according to the invention is shown by way of example in the accompanying drawing, this drawing being a cross-section taken along the axis of two coaxial tubular conduit members connected by one embodiment of a fluid-tight coupling assembly according to the invention.

In the construction shown one of the two coaxial tubular conduit members is in the form of a plain tube as indicated at 1, while the other is in the form of a tubular boss 2 formed with an external screwthread 3, and a "hexagon" 4 for engagement by a spanner. Associated with and connecting the two coaxial tubular conduit members 1 and 2 is a fluid-tight coupling assembly according to the invention comprising two axially displaced coaxial sleeves 5 and 6 having adjacent transverse faces 5a and 6a lying face to face and close to, but out of contact with, one another, the transverse face 6a having formed therein an annular groove 7 to receive a sealing member of the O-ring type 8 which, as shown, engages the face 5a of the sleeve 5.

The end of the sleeve 6 remote from the transverse face 6a is formed with a shoulder and step B to provide in co-operation with the member 2 an annular circumferential recess 9 in which can lie a sealing member of the O-ring type 10 which co-operates with the circumferential surface of the recess 9 and the surface of a spigot part 11 of the member 2 to form a fluid tight seal between the sleeve 6 and the member 2. The member 2 is also provided with a rigid shoulder 12 which, as the ring 10 is applied to the end of the sleeve 6 will serve to ensure that the O-ring 10 is caused to enter the recess 9 and will remain thereon during operation. A chamfer 9a is also provided to assist such entry. In addition a shoulder 13 forming the face of spigot-part 11 functions as an abutment co-operating with an adjacent face of the sleeve 6 to ensure that the O-ring 10 is not axially compressed between the member 2 and sleeve 6.

The sleeve 5 is provided with a shoulder 14 which limits it movement to the right in the drawing relative to the pipe 1 and is formed with a shoulder or step C to provide in co-operation with the pipe 1, a circumferential recess 15 to receive a sealing ring of the O-ring type 16 arranged to form a seal between the circumferential surface of the recess 15 and the outer circumference of the pipe 1 as shown. The outer end of the circumferential recess 15 internally of sleeve 5 is formed with a chamfer 17 to ensure and facilitate proper entry of the O-ring 16 into the recess 15 during assembly. There is also associated with the sleeve 5 a spacing piece in the form of a ring 18 having a flange 19 the inside face 25 of which serves as an abutment co-operating with the extreme end face of sleeve 5 to limit the relative movement of the ring and sleeve to maintain O-ring 16 free of axial compression therebetween, and a tubular extension 19a which serves during assembly, to ensure that the O-ring 16 is moved properly into the recess 15, the end face 26 of extension 19a providing a rigid shoulder maintaining the ring in the recess during operation.

From what has been said, it will be understood that an annular area of each of the adjacent sleeve faces 5a, 6a within the sealing confines of O-ring 8 will be exposed to the internal operating pressure within the entire assembly. Similarly, there will be a total annular area at each of the remote sleeve faces exposed to the same pressure. According to the invention, the mean radius of the annular area of the adjacent faces is less than the mean radius of the total annular area of the remote faces so as to provide a net force urging the sleeves together. As the exact radius of such areas can possibly undergo slight change due to compression of one or more of the O-rings or can vary slightly around each ring, the term "mean radius" is employed to denote the average effective radius of the area actually subjected to operating pressure, including the part of the surface of any O-ring seal through which such pressure exerts an axial force on its associated sleeve.

For the purpose of maintaining the pipe 1 and the member 2 coaxial, and if necessary drawing the pipe 1 into the position shown relative to the member 2, a collet 20 capable of being radially contracted and having serrations 21 on its inner face is provided, this collet having a tapered frusto-conical outer surface 22 which is engaged by a corresponding tapered frusto-conical inner surface 23 on a tubular connecting piece 24 the end of which remote from the surface 23 is internally screwthreaded to engage the screwthread 3.

It will be seen that as the radius of the remote faces of the two sleeves is greater than the radius of the adjacent faces thereof, fluid pressure from within the pipe 1, member 2 and sleeves 5 and 6 will exert a greater axial force on remote faces of the sleeves 5 and 6 in a direction urging them towards one another than it will exert on the adjacent faces of the sleeves 5 and 6 so that there will be resultant axial forces due to such fluid pressure tending always to press the sleeves 5 and 6 toward one another and thus maintain fluid tight contact between the adjacent ends of the sleeves 5 and 6 through the medium of the O-ring 8, no axial forces being applied to the sleeves 5 and 6 by the action of the connecting piece 24. It will thus be apparent that the coupling assembly can remain fluid tight in spite of small relative axial movement between the pipe 1 and the member 2 since this movement can be accommodated by relative axial movement between the sleeve 5 and pipe 1 and/or between the sleeve 6 and the member 2 without affecting the effectiveness of the O-ring seals 10 and 16 while the action of the fluid pressure will always maintain the fluid-tight seal provided by the O-ring seal 8.

It will also be apparent that by unscrewing the connecting piece 24 from the member 2 and sliding the piece 24 to the right so that it lies beyond the plane in which the surface 6a lies, the pipe 1 can be moved laterally relatively to the member 2 to disconnect the pipe 1 from the member 2 and enable, if required the parts 5, 6, 10, 8, 16, 18 and 20 to be removed. Similarly, while the pipe 1 is laterally displaced from the member 2 the parts 24, 20, 18, 16 and 5 can be assembled on the end of the pipe 1, the parts 10, 6 and 8 can be assembled in and on the member 2, and the pipe 1 can then be brought into a position coaxial with the part 2 as shown so that the sleeves 5 and 6 and their associated parts form a fluid tight coupling between the pipe 1 and the part 2, after which the connecting piece 24 can be brought into position and screwed to the part 2 to hold the parts 1 and 2 in this coaxial position.

What I claim as my invention and desire to secure by Letters Patent is:

1. A pressure sealing, fluid tight coupling assembly for connecting the spaced-apart ends of two coaxial tubular conduit members, said assembly comprising two coaxial sleeve sections arranged in serial relationship between the spaced-apart ends of said conduit members, the mutually adjacent ends of said sleeve sections terminating in generally transverse annular surfaces; an O-ring of resilient material situated between said transverse annular surfaces in sealing engagement therewith, means holding the ring in substantially coaxial relation; the remote end of each of said sleeve sections extending in limited telescoping relation to a peripheral surface adjacent the terminal end of the corresponding conduit member, the telescoping portion of said sleeve section being formed with at least one coaxial annular step; a further O-ring of resilient material seated on said step of each sleeve section for sealing engagement with the opposed peripheral surfaces on said sleeve section and conduit member; rigid shoulder means separate from and adjacent to said sleeve section end for maintaining said further O-ring in position during operation, said rigid shoulder means defining with said step and said conduit member periphery a chamber enclosing said O-ring, said shoulder means including abutment means engaging said sleeve section to limit the axial position of said shoulder means to said step to a minimum axial dimension between adjacent transverse surfaces of said shoulder means and step not less than the maximum axial thickness of said O-ring; the corresponding surfaces of said sleeve section and conduit member between said step and the bore of said assembly being spaced apart and in direct communication with said bore to admit fluid at operating pressure to said chamber, said O-ring maintaining such pressure in said chamber to expose the surfaces defining said chamber to said pressure; the total annular area of the transverse surfaces exposed to operating fluid pressure at each of the remote ends of the two sleeve sections having a mean radius in excess of the mean radius of the annular area of the transverse surface of each of the mutually adjacent section ends within the sealing ends within the sealing confines of the O-ring therebetween; and means surrounding said sleeve sections and adapted to engage at least one of said conduit members to loosely hold said sleeve sections together.

2. The coupling assembly of claim 1 wherein the rigid shoulder means for one of said sleeve sections is a shoulder integral with one of said conduit members and for the other of said sections is an end face of a detached spacing ring surrounding the other of said conduit members, said spacing ring being held against free axial displacement by said last-named means for loosely holding the sections together.

3. The assembly of claim 1 wherein said means loosely holding the sleeve sections together comprises an elongated collar having means at one end for engaging said one conduit member and extending around said sleeve sections, a compressible collet encircling said other conduit member, and cooperating frusto-conical surfaces on said collet and the other end of said collar wedging said collet between said collar end and the conduit member which it encircles.

4. A pressure sealing, fluid tight coupling assembly for connecting one tubular conduit member to another tubular conduit with the bores thereof in coaxial, aligned relation, said assembly comprising a first sleeve section of radially outwardly stepped configuration loosely telescoping over a portion of its length with a terminal length of the interior of said one conduit member, one step on said sleeve section receiving an O-ring seal having its interior periphery seated against a peripheral surface of said step and its exterior periphery adapted to seat against an internal peripheral surface of said one conduit member, the end of said sleeve section remote of said conduit member end terminating in a transverse annular surface, said sleeve section and conduit member having cooperating abutment surfaces limiting the extent said section and member telescope together to keep said O-ring seal free of axial compression therebetween; a second sleeve section in coaxial alignment with said first sleeve section and having its adjacent end likewise terminating in a transverse annular surface; an O-ring seal separating said adjacent transverse surfaces in sealing contact therewith and means to hold said last-mentioned ring in place; said second sleeve section being of radially inwardly stepped configuration and having a portion of its length remote from said adjacent end loosely telescoping over the exterior of a terminal length of said other conduit member, one step on said second sleeve section receiving an O-ring seal having its interior periphery seated against the conduit member surface and its exterior periphery seated against a peripheral surface of said step; an annular spacing ring surrounding said other conduit member adjacent the remote end of said second sleeve to retain said last-mentioned O-ring in the interior of the step on said sleeve section, said sleeve section and spacing ring having cooperating abutment surfaces limiting the extent said section and ring can move towards each other to keep said last-mentioned O-ring seal free of axial compression therebetween; the total annular area of the transverse surfaces subjected to operating fluid pressure at each of the remote ends of said sleeve sections having a mean radius in excess of the mean radius of the annular area of the transverse surface at each of the adjacent section ends within the sealing confines of said O-ring seal therebetween; and means surrounding said sleeve sections and adapted to engage said one sleeve section to loosely hold the other parts of said assembly together and prevent axial separation thereof.

References Cited by the Examiner

UNITED STATES PATENTS

| | | | |
|---|---|---|---|
| 376,061 | 1/88 | Benjamin | 285—99 |
| 1,615,536 | 1/27 | Del Mar | 285—334.2 |
| 1,930,833 | 10/33 | Barrett | 285—334.2 |
| 3,057,646 | 10/62 | Brumagin | 285—134 |

FOREIGN PATENTS 922,314   1/55   Germany.

CARL W. TOMLIN, *Primary Examiner.*